US 8,291,241 B2

(12) United States Patent
Smith et al.

(10) Patent No.: US 8,291,241 B2
(45) Date of Patent: Oct. 16, 2012

(54) LOW POWER PEER DETECTION CIRCUIT (75) Inventors: Eric George Smith, San Jose, CA (US); Colin Whitby-Strevens, Ben Lomond, CA (US); Eric Anderson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 541 days.

(21) Appl. No.: 12/478,062

(22) Filed: Jun. 4, 2009

(65) Prior Publication Data
US 2010/0312921 A1 Dec. 9, 2010

(51) Int. Cl.
*G06F 13/00* (2006.01)

(52) U.S. Cl. ........ 713/300; 713/310; 713/320; 713/321; 713/322; 713/323; 713/324; 713/330; 713/340

(58) Field of Classification Search ............ 713/300, 713/310, 320–324, 330, 340
See application file for complete search history.

(56) References Cited

U.S. PATENT DOCUMENTS

| | | | |
|---|---|---|---|
| 5,822,246 A * | 10/1998 | Taub et al. | 365/185.18 |
| 5,923,664 A | 7/1999 | Aldebert et al. | |
| 6,199,119 B1 | 3/2001 | Duckwall et al. | |
| 6,247,083 B1 | 6/2001 | Hake et al. | |
| 6,831,928 B1 | 12/2004 | Hauck et al. | |
| 6,839,791 B2 | 1/2005 | Duckwall | |
| 6,973,125 B2 | 12/2005 | An | |
| 7,007,078 B2 | 2/2006 | Matsuda | |
| 7,401,173 B1 | 7/2008 | Whitby-Strevens | |
| 7,458,830 B2 | 12/2008 | Reid et al. | |
| 7,523,146 B2 | 4/2009 | Holt et al. | |
| 7,646,829 B2 * | 1/2010 | Ashley et al. | 375/340 |
| 2005/0237347 A1 * | 10/2005 | Yamaji et al. | 347/5 |
| 2006/0026448 A1 * | 2/2006 | Horii | 713/340 |
| 2006/0140311 A1 * | 6/2006 | Ashley et al. | 375/341 |
| 2008/0058032 A1 * | 3/2008 | Yamaji et al. | 455/574 |

* cited by examiner

*Primary Examiner* — M Elamin
(74) *Attorney, Agent, or Firm* — Fletcher Yoder PC (57) ABSTRACT

Systems and methods are disclosed for detecting the connection of a FireWire peer to a FireWire device. In one embodiment, a device may determine whether a peer connection is present based on peer detection circuit configured in each FireWire port of a FireWire device. When no peer is connected to a device, a peer connection in the circuit may be open, and a current path through the circuit may provide a low detect signal, indicating that no peer is connected. When a peer is connected to a detecting device, the current may pass through a resistance in the detected peer to provide a high detect signal, indicating that a peer is connected. In some embodiments, once a peer is detected, the FireWire system of the detecting device may be powered on, and the peer detection circuit may be powered off.

34 Claims, 5 Drawing Sheets

LOW POWER PEER DETECTION CIRCUIT

BACKGROUND

The present disclosure relates generally to data communications systems, and, more particularly, to the detection of peers in such systems.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

FireWire®, which is a trademark used by Apple Inc. to refer to a High Performance Serial Bus compliant with the IEEE 1394 standard, provides high speed information transfer between digital devices. Digital devices having FireWire capabilities may be connected through a serial bus for high speed data transfer in a peer-to-peer network. A serial bus may be connected to a FireWire device at one or more ports (e.g., IEEE 1394 ports, or FireWire ports). Each port may include a physical layer (PHY) through which data bits are transferred between the device and the connecting serial bus. The PHY at the port may have connection points to enable the device to detect a connection with another FireWire device (i.e., a peer). For example, the PHY chip on each device may have connection points for a signal pair, or a twisted pair A (TPA) and a twisted pair B (TPB), which receive and transmit information between the device and another peer in the network.

In a typical FireWire device, the TPA and TPB may be constantly powered, such that a current value at the port(s) of each device may be measured to determine whether a peer is connected to the device. However, the current used to perform this standard peer detection may be large, and the constant supplying of the current may consume a large amount of power.

SUMMARY

Certain aspects of embodiments disclosed herein by way of example are summarized below. It should be understood that these aspects are presented merely to provide the reader with a brief summary of the various techniques disclosed and/or claimed herein might take and that these aspects are not intended to limit the scope of any technique disclosed and/or claimed herein. Indeed, any technique disclosed and/or claimed herein may encompass a variety of aspects that may not be set forth below.

The present disclosure relates generally to systems and methods of detecting a connection between two peer devices. Two or more peer devices may form a network, and each device in the network may configured to be connectable with another device(s) (e.g., a peer) through a high speed serial bus. Devices may be connected when the serial bus is connected to a port on each device, and each device may be configured to determine when a peer is connected based on a detect signal measured from a peer detection circuit coupled to the port. For example, a peer detection circuit may be implemented at each port on the device, and may constantly draw a low current to detect for a peer connection until a peer connection is detected.

In one embodiment, the peer detection circuit may be configured such that the current is driven in one direction through the circuit when no peer is connected, and driven in another direction when a peer is connected. The path of the current may affect the strength of the detect signal, measured at a node on the peer detection circuit. The strength of the detect signal (e.g., a logical low or high) may indicate the absence or presence of a peer connection at that port. In one implementation, the system may disable the peer detection circuit once a peer is detected, and may enable the device to initiate high speed data transfers with the connected peer. Once a peer connection is detected by the peer detecting circuit, the device may also perform a standard detection process to confirm the detected peer connection.

BRIEF DESCRIPTION OF THE DRAWINGS

Advantages of the disclosed techniques may become apparent upon reading the following detailed description and upon reference to the drawings in which.

DETAILED DESCRIPTION OF SPECIFIC EMBODIMENTS

One or more specific embodiments of the present disclosure will be described below. These described embodiments are only exemplary of the presently disclosed techniques. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure generally relates to systems and methods of detecting a connection between interfaces compliant with IEEE 1394, using a peer detection circuit powered by a reduced current source. A device may have one or more ports having IEEE 1394 compliant interfaces configured to transfer information between peers through a high speed serial bus. Peer devices may be devices having IEEE 1394 compliant interfaces and the ability to communicate with each other on the serial bus. Peer devices may be referred to as peers even if they do not operate on the same level in a system. For example, a computer and a hard disk drive do not operate on the same level functionally, but each may have serial bus interfaces with communication capabilities, and may be referred to as peers. In certain embodiments, a device may determine whether a peer is connected to the device before initiating and/or enabling the high speed data transfer between peer devices. For example, the high speed data transfer may be controlled by a network chip coupled to the port and/or interface in the device. In typical systems, a standard method of detecting a peer connection may involve powering a portion of the network chip and measuring for the resistance of a connected peer. In the present techniques, the connection to a peer device may be first detected by an external circuit coupled to the port of the device, also referred to as a peer detection circuit.

A signal may be output from the external circuit, and the signal may indicate whether a peer is connected to the device. The signal may be based on a current path through the external circuit. For example, the current powering the external circuit may be driven in one direction if a peer is not connected, and the external circuit may output a low signal. Alternatively, current may be driven in another direction if a peer is connected, and the external circuit may output a high signal. In some embodiments, the external circuit may be disabled once a peer is detected, and the may initiate the network chip, which may confirm the peer detection by performing a standard peer detection process before initiating communication between the connected peers. As the current used to enable the external circuit is lower than a current used to enable a standard peer detection method, power may be conserved in embodiments of the present techniques.

Data transfers between electronic devices may typically be conducted over an interface. To conserve power, such interfaces may be wholly or partially powered down during periods in which such interfaces are not coupled to another interface. However, such interfaces should be powered up quickly in response to a connection being made. Presently, certain interfaces may include a circuit that monitors the ports of the interface to determine when a connection has been made, and once a connection is detected, the interface is powered up. Unfortunately, such circuits typically draw a relatively large amount of power (e.g., greater than 10 milliamps), and, thus, tend to substantially reduce the battery life of the electronic device. Accordingly, in accordance with the present techniques, a low power peer detection circuit may be coupled to the ports of an interface to determine whether a connection has been made. The low power peer detection circuit may draw substantially less power (e.g., 1 milliamp or less). Once so determined, the interface may be powered up. Consequently, significant power savings may be realized.

By way of example, an interface may include a serial bus. A serial bus may be classified or described based on its configuration and/or potential transfer speed. For example, a high speed serial bus may be capable of conducting high speed data transfers between two devices having IEEE 1394 compliant interfaces. The IEEE 1394 interface may describe a high speed serial bus interface standard for high speed communications and data transfer. An interface compliant with the IEEE 1394 interface standard may also be known by brand names, including, for example, FireWire® of Apple Inc. and i.LINK™ of Sony Corporation. The IEEE 1394 standards continue to evolve with developments in high speed serial bus interfaces. For example, a high speed serial bus compliant with the IEEE 1394b-2002 interface standard may transfer data between electronic devices at up to 800 Mbps., whereas devices having interfaces compliant with the IEEE 1394-2008 may transfer at 1.6 Gbps and 3.2 Gbps. High speed serial buses having higher transfer speeds may also be developed and still be within the field in which the presently disclosed techniques may be useful. For example, in accordance with an IEEE P1394d standard, a single mode fiber may be provided as an additional transport medium, which may increase data transfer speeds to up to 6.4 Gbps.

In accordance with the present techniques, a peer detection method, such as a device configured to detect a peer connection, may be implemented in a variety of networks where devices may be connected for data transfer. Such networks may include devices, interfaces, and serial buses compatible with the IEEE 1394 interface standard. Though the present techniques may apply to many interfaces, including IEEE 1394 compliant devices, the present disclosure may refer to FireWire as an example. Each FireWire device may have one or more ports where a serial bus may connect the device to other peers, such as other FireWire devices. Each port may be configured with a serial bus interface through which data may be transferred between the device and the serial bus. The interface may include a "physical layer" or a "PHY."

A peer detection circuit may be coupled to the port and/or the interface, and may be configured such that a current is driven in different paths through the circuit depending on whether or not a peer is connected to the detecting device. In some embodiments, the peer detection circuit may be external to the FireWire chip or traditional FireWire circuitry in the device. The different paths of the current may result in a different detect signal, which is a signal measured at a node from the peer detection circuit and used to indicate whether a peer is connected. In some embodiments, depending on the strength of the detect signal (e.g., low or high), a peer may either be connected or not connected. The current drawn by the peer detection circuit may be substantially smaller than a current used by a standard peer detection method in a typical FireWire device, such that operating the peer detection circuit instead of the standard peer detection method may result in reduced power consumption in the device. For example, the peer detection circuit may draw current to detect a peer connection. Once a peer connection is detected, the peer detection circuit may stop operating, and the standard peer detection may begin operating to confirm the peer detection. The current drawn by the standard peer detection may be greater than the current drawn by the peer detection circuit. Thus, as the standard peer detection only operates once a peer connection is detected, and does not constantly operate to monitor for a peer connection, power may be conserved by using the peer detection circuit to monitor peer connections.

Figure 1:
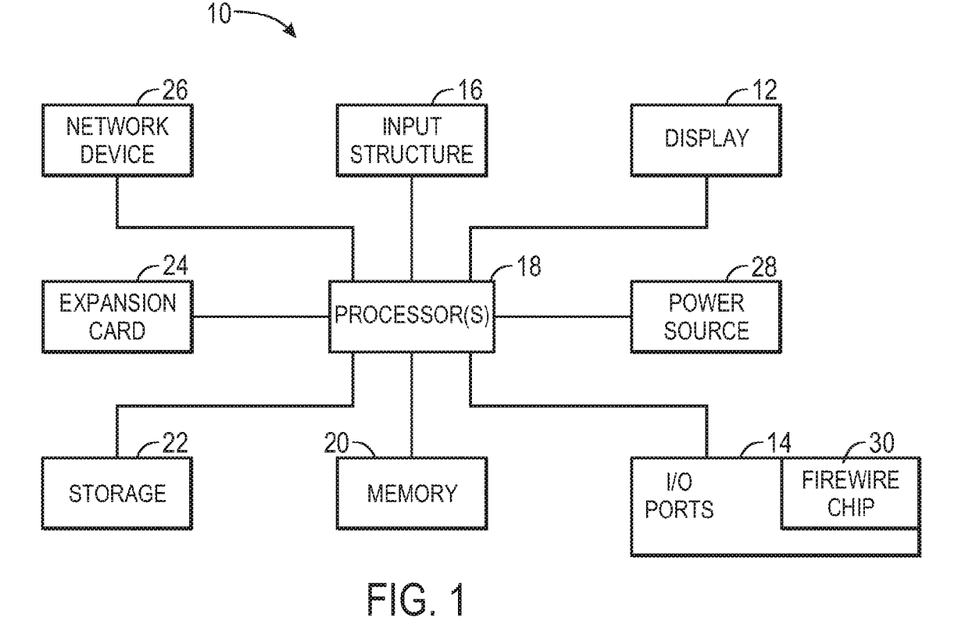
FIG. 1 is a block diagram depicting components of an electronic device, in accordance with aspects of the present techniques.
Figure 2:
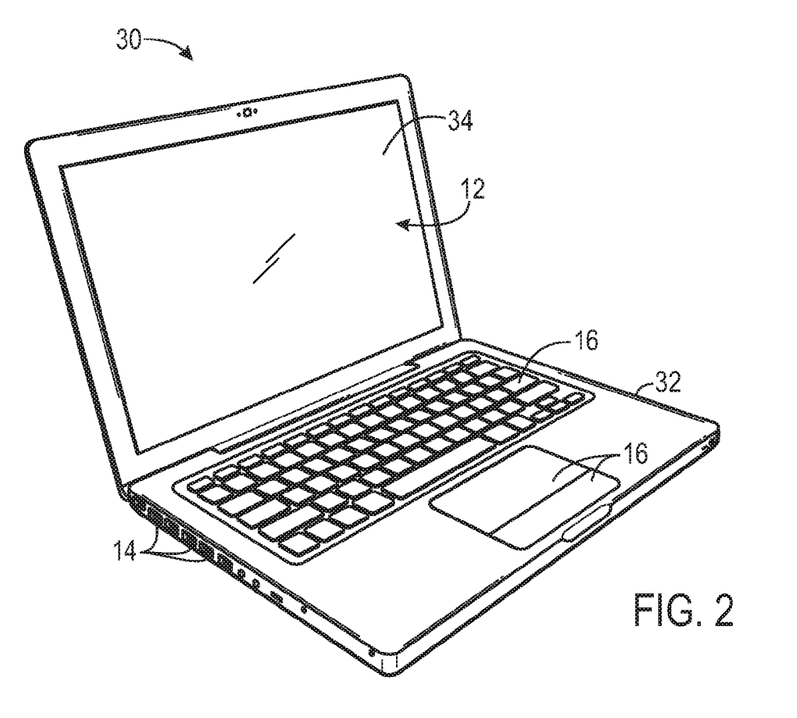
FIG. 2 is a view of a computer, in accordance with aspects of the present techniques.

With these foregoing features in mind, a general description of suitable electronic devices configured to connect and test for connections with other devices in accordance with aspects of the present disclosure is provided below. In FIG. 1, a block diagram depicting various components that may be present in electronic devices suitable for use with the present techniques is provided. In FIG. 2, one example of a suitable electronic device, provided here as a computer system, is depicted. These types of electronic devices, and other electronic devices providing data transfer capabilities, may be used in conjunction with the present techniques.

An example of a suitable electronic device may include various internal and/or external components which contribute to the function of the device. FIG. 1 is a block diagram illustrating the components that may be present in such an electronic device 10 and which may allow the device 10 to function in accordance with the techniques discussed herein.

Those of ordinary skill in the art will appreciate that the various functional blocks shown in FIG. 1 may comprise hardware elements (including circuitry), software elements (including computer code stored on a computer-readable medium) or a combination of both hardware and software elements. It should further be noted that FIG. 1 is merely one example of a particular implementation and is merely intended to illustrate the types of components that may be present in a device 10. For example, in the presently illustrated embodiment, these components may include a display 12, I/O ports 14, input structures 16, one or more processors 18, a memory device 20, a non-volatile storage 22, expansion card(s) 24, a networking device 26, and a power source 28.

The I/O ports 14 may include ports configured to connect to a variety of external devices, including other electronic devices. The I/O ports 14 may connect two devices, for example, devices configured for data transfer via a high speed data bus (e.g., FireWire devices), and may support other interface types, such as other IEEE-1394 interfaces. The I/O ports 14 may be coupled to a FireWire chip 30, which may enable the device 10 to transfer data with other devices via a high speed data bus. The I/O ports 14 and/or the FireWire chip 30 may also be coupled to circuitry (e.g., a peer detection circuit, not shown) configured to detect connections with other devices. The circuitry may be configured to output signals corresponding to such detections to a processor 18 in the system.

With the foregoing in mind, FIG. 2 illustrates an electronic device 10 in the form of a computer. For instance, such computers may include computers that are generally portable (such as laptop, notebook, and tablet computers) as well as computers that are generally non-portable (such as conventional desktop computers, workstations and/or servers). In certain embodiments, the electronic device 10 in the form of a computer may be a model of a MacBook®, MacBook® Pro, MacBook Air®, iMac®, Mac® mini, or PowerBook® available from Apple Inc. The depicted computer 10 includes a housing 32, the display 12, the input structures 16, and the I/O ports 14.

In one embodiment, the input structures 16 may include a keyboard, a touchpad, as well as various other buttons and/or switches which may be used to interact with the computer 10, such as to power on or start the computer, to operate a GUI or an application running on the computer 10, as well as adjust various other aspects relating to operation of the computer 10 (e.g., sound volume, display brightness, etc.). For example, a keyboard and/or a touchpad may allow a user to navigate a user interface (e.g., GUI) or an application interface displayed on the LCD 34.

As shown in the present figure, the electronic device 10 in the form of the computer 10 may also include various I/O ports 14 that provide for connectivity to additional devices, including, for example, another computer, or other electronic devices 10 (such as a handheld device, a projector, a supplemental display, an external storage device, or so forth). For instance, the computer 10 may include an I/O port 14, such as a FireWire® (IEEE 1394) port, a USB port, a high definition multimedia interface (HDMI) port, or any other type of port that is suitable for connecting to an external device. Additionally, the computer 10 may include network connectivity (e.g., network device 26), memory (e.g., memory 20), and storage capabilities (e.g., storage device 22), as described above with respect to FIG. 1. Thus, the computer 10 may store and execute a GUI and various other applications.

As discussed, an electronic device 10 may include a device, such as a computer (FIG. 2), may be capable of connecting to another device (i.e., a peer) through its high speed serial bus for high speed data transfer. For example, the device 10 may be a FireWire device. The I/O ports 14 may have a bus interface, or a physical layer (PHY), allowing the transfer of data between the device 10 and a serial bus. A diagram illustrating a FireWire connection 40 is presented in FIG. 3, where a FireWire device 42 is connected to a second FireWire device (i.e., a peer) 44 through a cable 46. The cable 46 may be a high speed serial bus, and may include multiple wires, including wires to transmit and receive data, as well as wires to carry power. The wires which transmit and receive data are illustrated in the FireWire connection 40 as the first signal pair 48 and the second signal pair 50, which may include the receiving and transmitting twisted pairs (i.e., TPB and TPA, respectively) between the two devices 42 and 44. The ports where the two devices 42 and 44 are connected by the cable 46 may each include a physical layer (labeled $PHY_1$ and $PHY_2$, respectively) to allow data transfer between the devices 42 and 44 and the cable 46. The first signal pair 48 and the second signal pair 50 may both connect the $PHY_1$ of the first device 42 to the $PHY_2$ of the second device 44.

Figure 3:
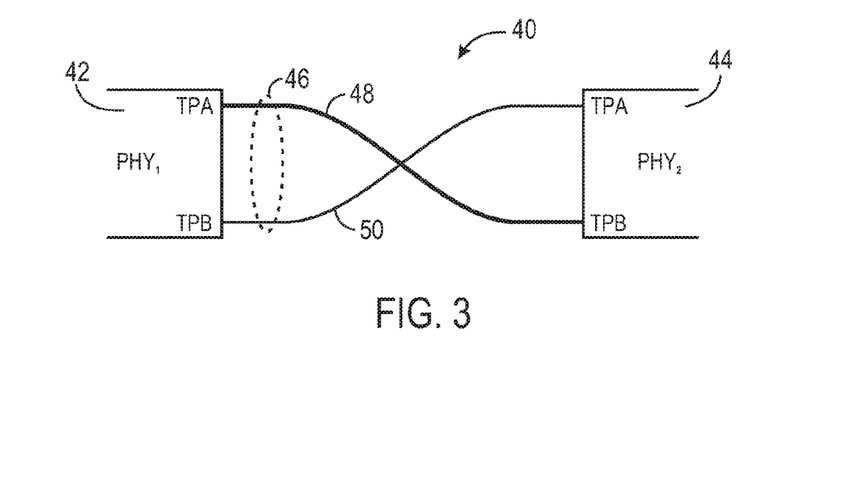
FIG. 3. is a diagram depicting a connection between two peers, in accordance with aspects of the present techniques.

In one or more embodiments, the PHYs of a device 42 or 44 may transmit and receive data on different signal pairs 48 and 50. Each device 42 and 44 may receive information on a signal designated as a twisted pair A (TPA), and may transmit information on a signal designated as a twisted pair B (TPB). As used herein, a "signal pair" may refer to the wiring and/or the signal carried between two peer devices 42 and 44, including signals transmitted from one device 42 (TPB) and received at the peer 44 (TPA), signals transmitted from the peer 44 (TPB) and received at the device 42 (TPA), as well as the wiring or buses carrying such signals. For example, the first signal pair 48 may connect at the TPA of $PHY_1$ to transmit information to be received at the first device 42, and the second signal pair 50 may connect at the TPB of $PHY_1$ to transmit information from the first device 42. The first signal pair 48 and the second signal pair 50 may be crossed so that information transmitted from the TPB of $PHY_1$ (on the second signal pair 50) may be received at the TPA of $PHY_2$, and information can be transmitted on the first signal pair 48 from the TPB of $PHY_2$ to be received at the TPA of $PHY_1$.

Before a device 42 may begin to exchange information with a peer 44, the device may first detect whether a peer 44 is connected. A more detailed view of the FireWire connection 40, as well as the position of a peer detection circuit 60 in accordance with the present techniques, is presented in FIG. 4, which illustrates a peer connection 52. The connection 52 may be made between a physical layer on the port of the first device 42 and a physical layer on the port of the peer device 44 via a cable 46. As discussed with respect to FIG. 3, the cable 46 may include a first signal pair 48 connecting the TPA of $PHY_1$ to the TPB of $PHY_2$, and a second signal pair 50 connecting the TPA of $PHY_2$ to the TPB of $PHY_1$. The twisted pair A and twisted pair B (TPA and TPB) may be so named because they comprise a pair of wires that are twisted to form the first signal pair 48 and the second signal pair 50. Further, the first signal pair 48 and the second signal pair 50 may be crossed within the cable 46 such that information may be properly transmitted from the first device 42 (TPB of $PHY_1$) to the second device 44 (TPA of $PHY_2$), and from the second device 44 (TPB of $PHY_2$) to the first device 42 (TPA of $PHY_1$).

Figure 4:
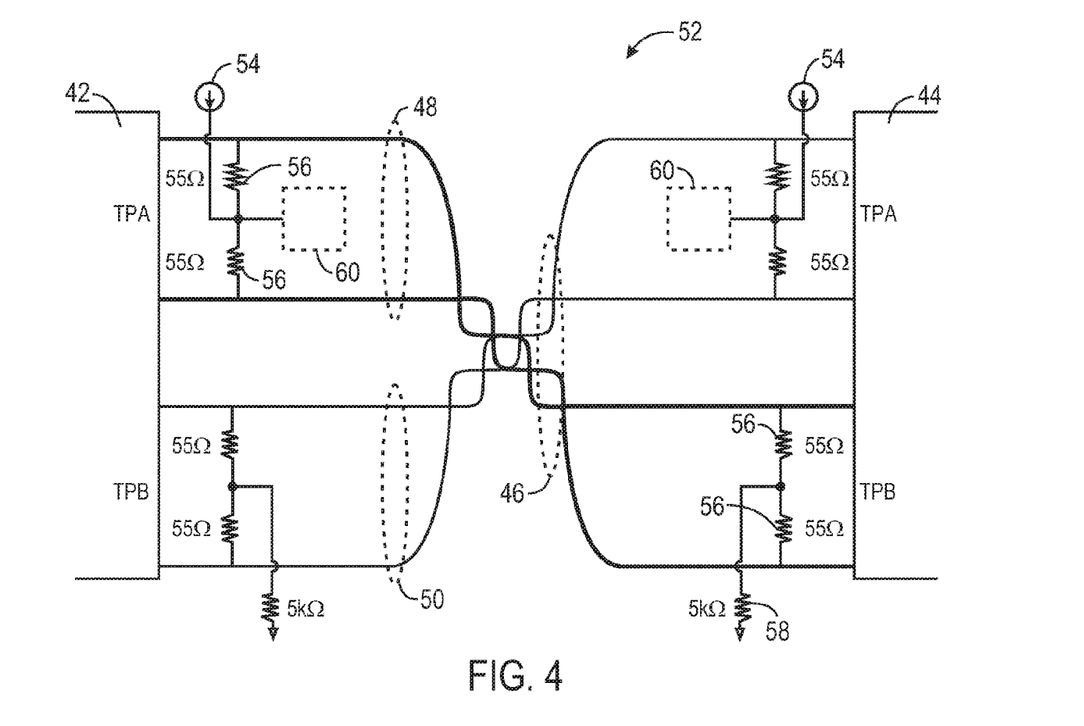
FIG. 4 is a diagram depicting a peer connection configured with a peer detection circuit, in accordance with aspects of the present techniques.

In the typical PHY of a FireWire device 42, and in one or more embodiments of the present techniques, a standard method of detecting a connection with a peer may include applying a current source 54 and measuring for a resistance 58 of a connected peer 44. For example, the current source 54 may be applied between two 55 ohm resistors 56 between the first signal pair 48 of the device 42. The current response may be measured to determine whether a peer 44 is connected to the device 42. A resistor 58 at the $PHY_2$ of a peer 44 may provide a current measurement to indicate that the peer 44 is connected. The resistor 58 may be a known value (e.g., 5 kΩ), and may drive the supply current low when the first signal pair 48 is connected to a peer 44. Alternatively, if the first signal pair 48 is not connected to a peer 44, the current may be driven high, as the connection may be open, and the current source 54 may charge a natural capacitance in the $PHY_1$ of the detecting device 42.

Though the standard peer detection method previously described may detect the presence of a peer connection, the constant supply of the current source 54 may consume a substantial amount of power from the system. In the present techniques, a peer detection circuit 60 may be implemented at or near the port of a device, and may be configured to detect a peer connection using a smaller current than the current source 54 for some standard peer detection methods. In some embodiments, a device 10 may supply the smaller current for the peer detection circuit 60 until a peer connection is detected. If the peer detection circuit 60 detects a peer connection, the device 10 may toggle a signal to disable the peer detection circuit 60 and enable the standard detection method to confirm a peer connection.

Figure 5:
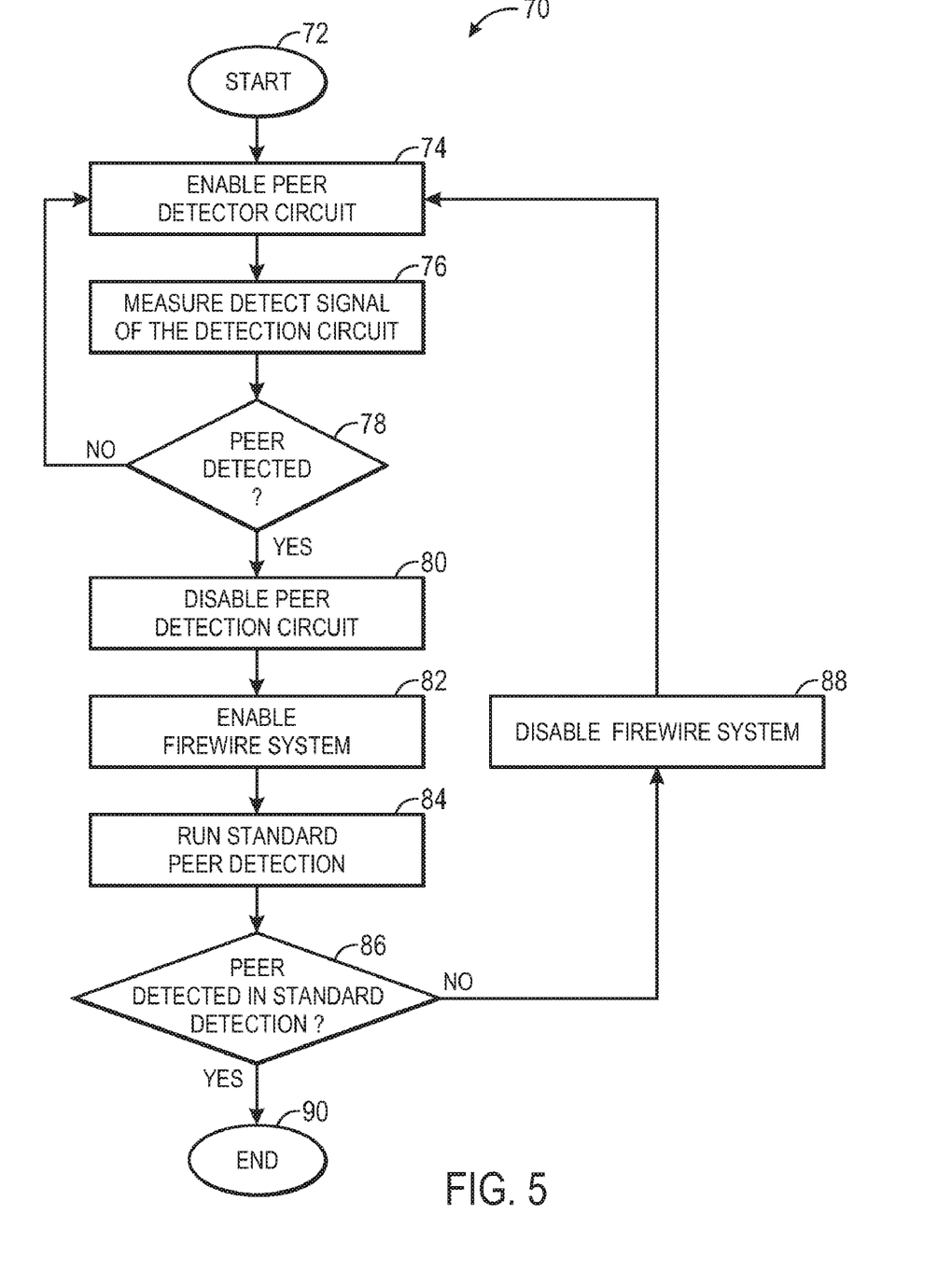
FIG. 5 is a flow chart of a process for determining a peer connection using a peer detection circuit, in accordance with aspects of the present techniques.

The flow chart of FIG. 5 provides a general overview of a process 70 for determining whether a peer 44 is connected using a peer detection circuit 60 (FIG. 4), as well as confirming the detection using a standard method, which may be enabled by the software in the device 10. A depiction of the software which may control and/or power the peer detection circuit 60 and/or the standard method is illustrated in the schematic diagram of FIG. 6. As FIGS. 4 and 6 both provide parts of a peer connection 52 and a software component 96 which are described with respect to the peer detection process 70 of FIG. 5, FIGS. 4-6 may be discussed concurrently.

The peer detection process 70 of the present techniques may start (block 72) when the peer detection circuit 60 is enabled by the device 10 (block 74). As discussed, the current provided by the peer detection circuit 60 may be substantially smaller than the current used by the standard current source 54 to power standard peer detection method in a typical FireWire device. In some embodiments, for example, while a standard method may constantly use approximately 50-60 mA, the current of the peer detection circuit 60 may be approximately 1 mA. The path of the current in the peer detection circuit 60 may be different depending on whether a peer 44 is connected to the device 42. The device 10 may measure a detect signal 94 from the peer detection circuit 60 (block 76), and the detect signal 94 may be different depending on the path of the current through the circuit 60. For example, a peer 44 may have a known resistance 58 at one port (e.g., at the $PHY_2$), such that a current flowing through the first signal pair 48 may result in a predictable (e.g., high) detect signal 94 when a peer 44 is connected. Alternatively, the current may flow in a different path through the peer detection circuit 60, if the first signal pair 48 is open, or not connected to a peer. The different flow paths of the current through the peer detection circuit 60 may result in a different detect signal 94 to indicate whether a peer is connected to the device 42 at that particular port.

Based on the detect signal 94, the device 10 may determine whether a peer 44 is connected to the device 42 (block 78). As depicted in the diagram of a portion of a FireWire system 92 in FIG. 6, a device 42 may have one or more ports, each having a physical layer (e.g., PHYa-n). A detect signal 94a-n may be measured from a respective peer detection circuit 60 (not shown in FIG. 6) coupled to each PHYa-n of the device 42. The detect signals 94a-n from each PHYa-n may be sent to an OR gate 96, such that if any of the detect signals 94a-n indicate that a peer 42 is connected to the device 42, the OR gate 96 may output a signal to software 98 in the device 10. In some embodiments, the software 98 may continue to enable the peer detection circuit 60 (block 74) such that a peer detection may be monitored until a peer is detected (block 78).

Figure 6:
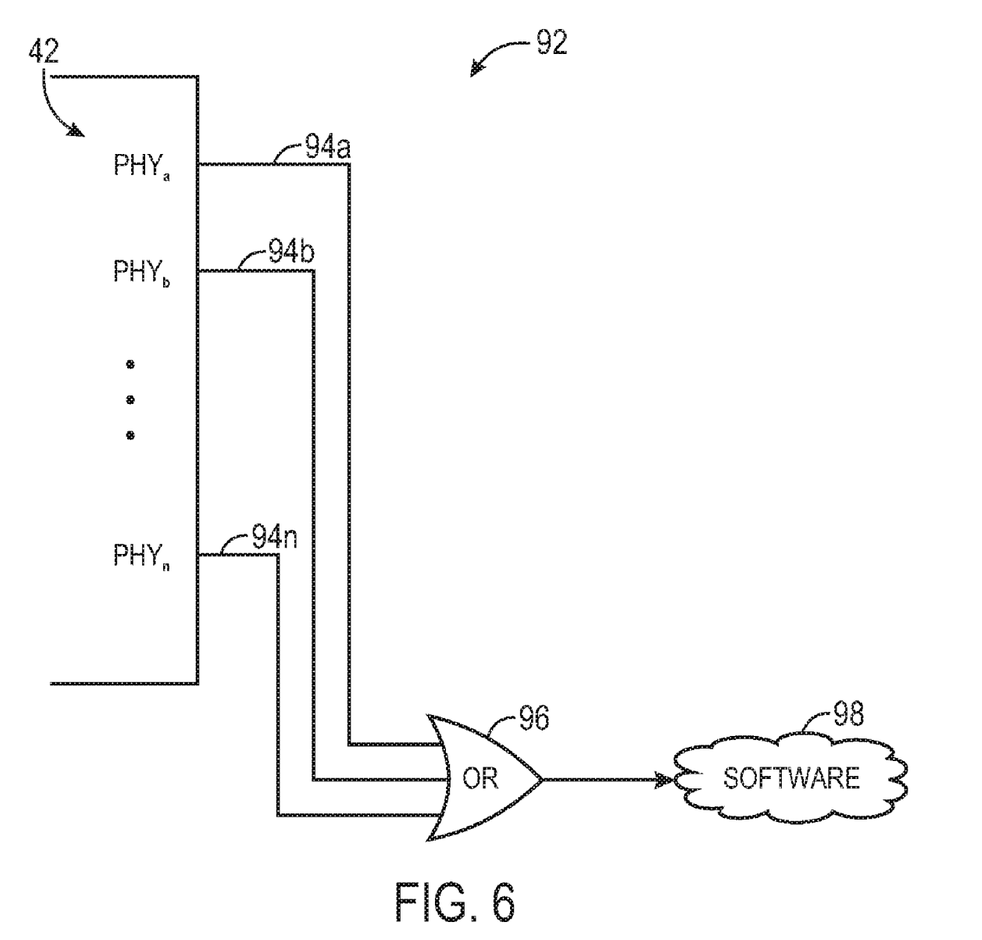
FIG. 6 is a diagram showing a portion of a FireWire system for analyzing detect signals from ports in a device, in accordance with aspects of the present techniques.

If a peer 42 is detected at one of the PHYa-n, the OR gate 96 may output a signal indicating a peer connection to the software 98. The software 98 may respond to the signal by disabling the peer detection circuit 60 (block 80). In some embodiments, when a peer is detected by the peer detection circuit 60, the software 98 may instruct the device 10 to enable the FireWire chip in the device 42 (block 82), which may allow the device 10 to begin transferring data with the connected peer 42.

In one or more embodiments, the peer detection process 70 may also confirm the peer detection of the detect signal 94 using the standard peer detection method (block 84). For example, once the software 98 receives the output from the OR gate 96 and enables the FireWire system (block 82), the device 10 may turn on the standard current source 54. As previously discussed, once the standard current source 54 is applied, measuring a known resistance 58 in a peer 42 may indicate whether the peer 42 is connected. Furthermore, the standard current source 54 may use a substantially higher current than the current generated by the peer detection circuit 60, and turning on the standard current source 54 only when the a peer connection is detected by the peer detection circuit 60 may conserve power in the device 10.

The device 10 may determine whether a peer connection has been confirmed by the standard detection method (block 86). In some embodiments, the standard detection method may result in a standard detect signal, which may also be directed to the OR gate 96, to a different OR gate, or to any other suitable logic unit in the device 10. If the standard detection method returns a result that does not indicate that a peer is connected to the device 42, the software 98 may disable the FireWire system (block 88), and may continue to monitor using the peer detection circuit 60 (block 74).

If the device 10 determines that a peer connection has been confirmed by the standard detection method (block 86), the FireWire chip may remain powered while the peer detection circuit 60 remains disabled, and the peer detection process 70 may end (block 90). In some embodiments, enabling the FireWire system and enabling the peer detection circuit 60 may be mutually exclusive. For example, a signal sent from the device 10 to the port (e.g., PHYa-n), or a signal sent from the device 10 to the FireWire chip in the device 42 may be toggled to either enable the peer detection circuit 60, or to enable the FireWire system and/or the standard detection method. The signal may be low, for instance, to power the peer detection circuit 60 while the FireWire chip remains off, and the signal may be toggled high to disable the peer detection circuit 60 while enabling the FireWire chip.

Figure 7:
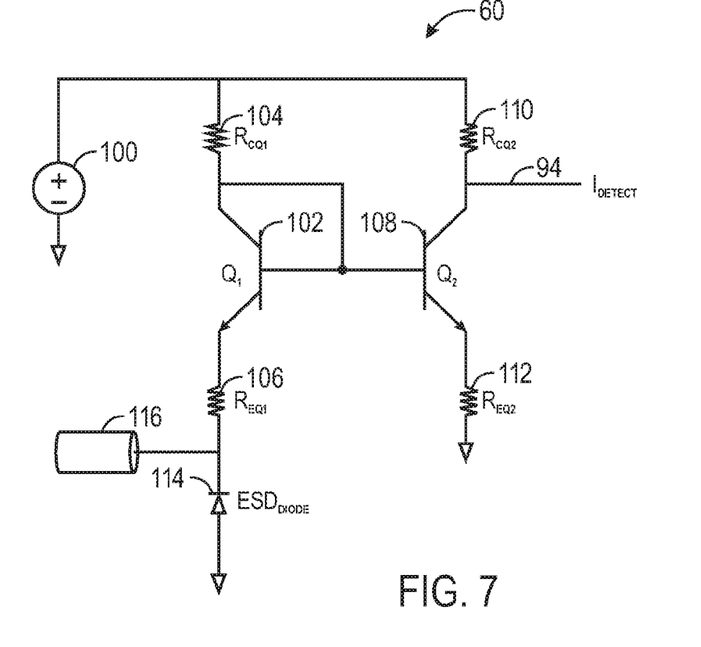
FIG. 7 is a schematic diagram illustrating a peer detection circuit when no peer is connected, in accordance with aspects of the present techniques.
Figure 8:
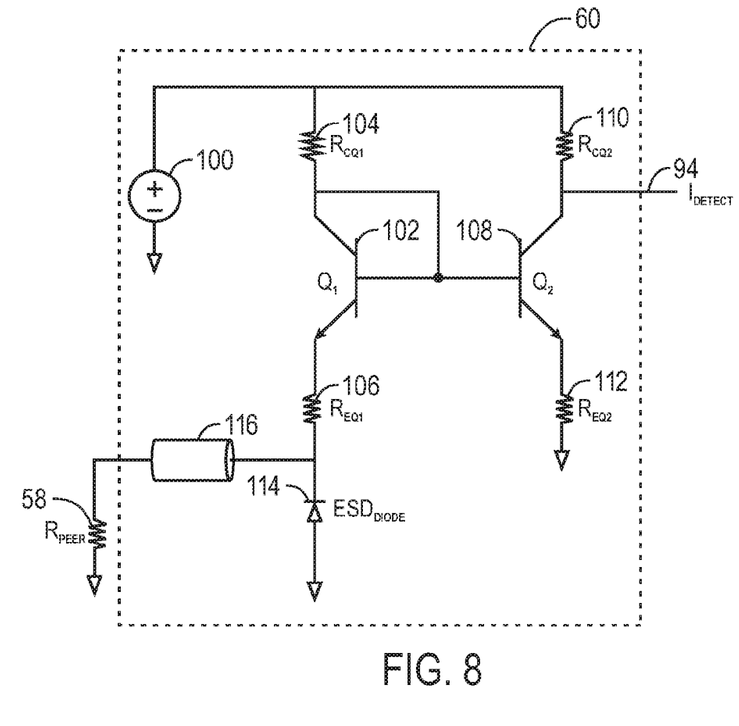
FIG. 8 is a schematic diagram illustrating a peer detection circuit when a peer is connected, in accordance with aspects of the present techniques.

A more detailed view of the peer detection circuit 60 is provided in the schematic diagrams of FIGS. 7 and 8. FIG. 7 depicts a peer detection circuit 60 when no peer is connected, and FIG. 8 depicts a circuit 60 when a peer is connected (portrayed as the peer resistance 58). A reduced current flows through the voltage source 100 and may flow through the peer detection circuit 60 in different ways depending on whether a peer resistance 58 is present. The peer detection circuit 60 may include two transistors 102 and 108, and in some embodiments, the current may be directed through the circuit 60 based on properties of a current mirror. In one embodiment, the peer detection circuit 60 may be comparable to an unbalanced current mirror. More specifically, the resistance values at the collectors and emitters of the transistors 102 and 108 may be selected to drive the current to the left or the right of the circuit 60, such that only one of the transistors 102 or 108 is kept active, based on whether a peer is connected. The circuit 60 may also be comparable to a digital receiver, and more specifically, an inverter with a voltage level translation. Because the circuit 60 operates in a narrow voltage range, the circuit 60 may have a voltage transfer curve resembling that of an inverter logic gate (i.e., an inverted step function). The voltage transfer curve of the circuit 60 may indicate when the circuit 60 switches on or off.

Further, the peer detection circuit 60 may be coupled to the PHY of a device. Typically, the PHY of a device may include an ESD protection diode, which may be designed to absorb electrostatic discharge (ESD) energy in an I/O port. The ESD protection diode in the PHY may sometimes interfere with peer detection. In the present techniques, the peer detection circuit 60 may take advantage of the high resistance of the ESD diode 114 in directing the path of the current.

Referring first to FIG. 7 where a peer is not connected, the current from the voltage source 100 may flow through the collector of transistor Q1 102. The resistance of the Q1 collector ($R_{CQ1}$) 104 may be large to keep the power of the system down, as the base current at Q1 102 may remain on so long as a peer is not detected. As a peer is not connected to the circuit via the high speed bus 116, the circuit at the bus 116 may be open, and may have an infinite resistance. The transistor Q1 102 may be connected to an ESD diode 114, which may also have a very high resistance. Thus, every current path out of the emitter of transistor Q1 102 may meet a high resistance. The resistance of the Q2 emitter ($R_{EQ2}$) 112 may have a resistance lower than the resistance of the ESD diode 114, and the current may be directed through the emitter of Q2 108. As transistors Q1 and Q2 have the same base voltage, and as the reduced current is directed to the emitter of Q2 108, transistor Q1 102 may become passive. The base current may be amplified only by transistor Q2 108.

The detect signal 94 may be measured at Q2 108 to determine whether a peer is connected to the peer detection circuit 60. As Q2 108 may be configured to have a high resistance at the collector ($R_{CQ2}$) 110, $R_{CQ2}$ 110 may pull the detect signal 94 high or low, which may indicate to the device 10 (FIG. 1) whether a peer connection has been detected. When the current is directed towards the emitter of Q2 108, and not to the emitter of Q1 102, Q2 108 may become active. Because Q2 108 is on, there may be collector current in Q2 108, and the detect signal 94 may be pulled low. Thus, a low detect signal 94 may indicate that a peer is not connected to the PHY of the detecting peer detection circuit 60.

The current may flow differently through the peer detection circuit 60 when a peer is connected to the device. As depicted in the diagram of FIG. 8, a peer may be connected at the end of a high speed bus 116, and may have a known resistance 58. Unlike in the earlier scenario of FIG. 7 where the current was directed away from the emitter of Q1 104 because of the high resistance of the open bus 116 and the ESD diode 114, current may flow through the resistor 58 at the PHY of a connected peer.

The current may first flow through $R_{CQ1}$ 104 to provide transistors Q1 102 and Q2 108 with the same base voltage. As previously discussed, $R_{EQ2}$ 112 may have a resistance that is less than the large resistance of the ESD diode. The $R_{EQ2}$ 112 may also have a resistance that is greater than that of the peer resistor 58. For example, the resistance of a peer resistor 58 may be a known value, such as 5 kΩ. As $R_{EQ2}$ 112 has a higher resistance than the peer resistor 58, the current may be directed to the emitter of Q1 102. The resistance 104 of the emitter of Q1 ($R_{EQ1}$ 104) may be selected to be significantly smaller than the peer resistor 58 such that it may not interfere with the peer measurement.

As the current is directed towards the emitter of Q1 102, and not to the emitter of Q2 108, Q2 108 may become passive. Because Q2 108 is off, there may be no collector current in Q2 108, and the detect signal 94 may not be pulled low. Thus, a high detect signal 94 may indicate that a peer is connected to the PHY of the detecting peer detection circuit 60.

The current may flow through the voltage source 100 as long as a peer is not detected. As previously discussed, the peer detection circuit 60 may be powered with a substantially smaller current than the standard current 54 used to power a standard detection method. In some embodiments, the standard detection method may still be used to confirm a peer detection from the peer detection circuit 60. Thus, while the standard current 54 may be supplied in limited situations when a peer is detected, continuous peer detection is provided through a lower power peer detection circuit 60.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

What is claimed is:

1. A data communication circuit comprising:
a communication interface having a data communication port and having a first peer detection circuit operably coupled to the data communication port, the first peer detection circuit being adapted to deliver a first peer detection signal in response to a peer being coupled to the data communication port; and
a second peer detection circuit operably coupled to the data communication port, the second peer detection circuit having a power draw less than the first peer detection circuit and being adapted to deliver a second peer detection signal in response to a peer being coupled to the data communication port, wherein the second peer detection circuit is operable to detect connection of the peer when the communication interface and the first peer detection circuit are powered down.

2. The data communication circuit of claim 1, wherein the communication interface comprises a high speed serial bus.

3. The data communication circuit of claim 2, wherein the high speed serial bus is compliant with the IEEE 1394 interface standard.

4. The data communication circuit of claim 2, wherein the high speed serial bus comprises a FireWire bus.

5. The data communication circuit of claim 1, wherein the first peer detection circuit is internal to the communication interface.

6. The data communication circuit of claim 1, wherein the first peer detection circuit draws 10 milliamps of current or more.

7. The data communication circuit of claim 1, wherein the second peer detection circuit is external to the communication interface.

8. The data communication circuit of claim 1, wherein the second peer detection circuit draws 1 milliamp of current or less.

9. The data communication circuit of claim 1, wherein the second peer detection circuit comprises an unbalanced current mirror, a first leg of the current mirror being operably coupled to the communication port and a second leg of the current mirror being operably coupled to a ground of the second peer detection circuit, wherein current passes primarily through the second leg of the current mirror when a peer is not coupled to the communication port, and wherein the current passes primarily through the first leg of the current mirror when a peer is coupled to the communication port.

10. The data communication circuit of claim 9, wherein the coupling of the peer to the communication port causes generation of one or more of the first peer detection signal and the second peer detection signal.

11. An electronic device comprising:
a processing unit;
a communication interface operably coupled to the processing unit, the communication interface having a data communication port and having a first peer detection circuit operably coupled to the data communication port, the first peer detection circuit being adapted to deliver a first peer detection signal in response to a peer being coupled to the data communication port; and
a second peer detection circuit operably coupled to the data communication port, the second peer detection circuit having a power draw less than the first peer detection circuit and being adapted to deliver a second peer detection signal in response to a peer being coupled to the data communication port, wherein the processing unit disables power to the communication interface when a peer is not coupled to the data communication port and wherein the second peer detection circuit is operable to detect connection of the peer when the communication interface is disabled and to deliver the second peer detection signal to the processing unit.

12. The electronic device of claim 11, wherein the processing unit is configured to power down the second peer detection circuit and power up the first peer detection circuit in response to receiving the second peer detection signal.

13. The electronic device of claim 12, wherein the processing unit is configured to determine whether the first peer detection circuit delivers the first peer detection signal.

14. The electronic device of claim 13, wherein the processing unit is configured to maintain the power down mode of the second peer circuit and power up the communication interface if the first peer detection signal is delivered.

15. The electronic device of claim 13, wherein the processing unit is configured to power down the first peer detection circuit and power up the second peer detection circuit if the first peer detection signal is not delivered.

16. The electronic device of claim 11, wherein the communication interface comprises a high speed serial bus.

17. The electronic device of claim 11, wherein the high speed serial bus is compliant with an IEEE 1394 interface standard.

18. The electronic device of claim 11, wherein the high speed serial bus comprises a FireWire bus.

19. The electronic device of claim 11, wherein the first peer detection circuit is internal to the communication interface.

20. The electronic device of claim 11, wherein the first peer detection circuit draws 10 milliamps of current or more.

21. The electronic device of claim 11, wherein the second peer detection circuit is external to the communication interface.

22. The electronic device of claim 11, wherein the second peer detection circuit draws 1 milliamp of current or less.

23. A method of determining whether a peer is coupled to a communication interface, the communication interface having a data communication port and an internal peer detection circuit, the method comprising:
monitoring the data communication port via a peer detection circuit external to the communication interface, the external peer detection circuit generating a peer detection signal in response to a peer being coupled to the data communication port;
turning off the external peer detection circuit and turning on the internal peer detection circuit in response to receiving the peer detection signal;
determining whether the internal peer detection circuit detects a connection of the peer to the data communication port;
if the internal peer detection circuit detects a connection of the peer, maintaining the external peer detection circuit in an off state and turning on the communication interface; and
if the internal peer detection circuit does not detect a connection of the peer, turning off the internal peer detection circuit and turning on the external peer detection circuit.

24. The method of claim 23, wherein monitoring the data communication port comprises drawing approximately 1 milliamp or less from the external peer detection circuit.

25. The method of claim 23, wherein monitoring the data communication port comprises primarily drawing current through a first leg of a current mirror if no peer is connected and primarily drawing current through a second leg of the current mirror if a peer is detected.

26. The method of claim 23, wherein turning off the external peer detection circuit comprises a processing unit receiving the peer detection signal and disabling the peer detection circuit and enabling the internal peer detection circuit in response thereto.

27. The method of claim 23, wherein determining whether the internal peer detection circuit detects the connection of the peer comprises a processing unit receiving an internal peer detection signal from the internal peer detection circuit.

28. The method of claim 23, wherein maintaining the external peer detection circuit in an off state and turning on the communication interface comprises a processing unit disabling the external peer detection circuit from drawing power and powering the communication interface in response to the internal peer detection circuit detecting the connection of the peer.

29. The method of claim 23, wherein turning off the internal peer detection circuit and turning on the external peer detection circuit comprises a processing unit disabling the internal peer detection circuit from drawing power and powering the external peer detection circuit in response to the internal peer detection circuit not detecting the connection of the peer.

30. A data communication circuit comprising:
a communication interface having a data communication port; and
a peer detection circuit operably coupled to the data communication port, the peer detection circuit being adapted to output a voltage in response to a peer being coupled to the data communication port, wherein the peer detection circuit remains on to detect connection of the peer when the output voltage is low, and the peer detection circuit is switched off when the output voltage is high.

31. The data communication circuit of claim 30, wherein the communication port comprises a second detection circuit configured to deliver a signal in response to a peer being coupled to the data communication port.

32. The data communication circuit of claim 31, wherein the second detection circuit is configured to switch on when the peer detection circuit is switched on.

33. The data communication circuit of claim 31, wherein the second detection circuit is configured to switch off when a peer is not coupled to the data communication port.

34. The data communication circuit of claim 33, wherein the peer detection circuit is configured to switch on when the second detection circuit is switched off.

* * * * *